(12) United States Patent
Edmark

(10) Patent No.: US 7,149,710 B1
(45) Date of Patent: Dec. 12, 2006

(54) VIRTUAL SHOWROOM SYSTEM AND METHOD

(76) Inventor: Tomima L. Edmark, P.O. Box 671269, Dallas, TX (US) 75367-1269

( * ) Notice: Subject to any disclaimer, the term of this patent is extended or adjusted under 35 U.S.C. 154(b) by 647 days.

(21) Appl. No.: 09/918,075

(22) Filed: Jul. 30, 2001

Related U.S. Application Data

(63) Continuation-in-part of application No. 09/564,372, filed on May 2, 2000.

(51) Int. Cl.
G06Q 30/00 (2006.01)

(52) U.S. Cl. .......................................... 705/26; 705/27
(58) Field of Classification Search .................. 705/26, 705/27

See application file for complete search history.

(56) References Cited

U.S. PATENT DOCUMENTS

| | | | |
|---|---|---|---|
| 5,665,951 A * | 9/1997 | Newman et al. | 235/375 |
| 5,897,620 A | 4/1999 | Walker et al. | 705/5 |
| 5,960,411 A | 9/1999 | Hartman et al. | 705/26 |
| 6,012,045 A | 1/2000 | Barzilai et al. | 705/37 |
| 6,138,106 A * | 10/2000 | Walker et al. | 705/14 |
| 6,240,397 B1 * | 5/2001 | Sachs | 705/27 |
| 6,464,583 B1 * | 10/2002 | Kidron | 463/25 |
| 6,633,849 B1 * | 10/2003 | Dodd | 705/1 |
| 2002/0026377 A1 * | 2/2002 | Takahashi | 705/26 |

FOREIGN PATENT DOCUMENTS

JP 411235256 A * 8/1999

OTHER PUBLICATIONS

Allen, Debra, Ye olde online book shoppes, Link-up, dates Dec. 2000.*

* cited by examiner

*Primary Examiner*—Mark Fadok
(74) *Attorney, Agent, or Firm*—Baker Botts L.L.P.

(57) ABSTRACT

The present invention provides a method for conducting a transaction which includes presenting a plurality of gift sets to a purchaser, wherein each gift set comprises a plurality of articles. A selection may be received from the purchaser, the selection comprising at least one of the plurality of gift sets. The method may also include receiving identification information regarding a recipient of the gift set. A notification including a unique identifier may be issued to the recipient. In accordance with a particular embodiment, if the recipient accepts the gift set, delivery of the selection to the recipient may be scheduled.

34 Claims, 15 Drawing Sheets

FIG. 3A

HerRoom.com
LINGERIE WE BUY FOR OURSELVES

Bras | Panty wear | Slips & More | Shape wear | Maternity | Accessories | HisRoom Her Room Boutique

ABC     ABC

ABC is the flagship lingerie brand of ABC Corp, which is owned by XYZ Inc. ABC has a 30-year tradition of products with fashion, fit, comfort, quality and design.

Founded in the mid-1950's by John and Jane Doe, ABC is leveraging its rich product heritage today through luxurious fabrics, unyielding quality and above all, a dedicated team of employees committed to ABC Corp's success. ABC is distributed primarily through department and specialty lingerie stores.

Fitter's Comments

- Floral satin minimizer with comfort straps.
- Underwire minimizer reduces up to 1-3/4".
- Back panels are breathable.
- Side seams are 3-1/2" wide.
- Contoured and padded 3/4" straps adjust in back.
- Three row, three column hook and eye closure.

FIG. 5

HerRoom.com
LINGERIE WE BUY FOR OURSELVES

Bras | Panty wear | Slips & More | Shape wear | Maternity | Accessories | HisRoom Her Room Boutique

ABC

B-Style Bra
Brand Profile

Blueprint
Click to get a measurement grid

THE FITTING ROOM
Click to see how it looks with these necklines:

88 button down | 89 scoop neck | 90 boat neck | 91 square neck | 92 deep v-neck | 93 cutaway tank

Product Description
B-Style Bra
- Floral satin minimizer with comfort straps.
- Superior bust reduction
- Minimizes with shape for a flattering silhouette.
- Seamed, non-stretch satin delustered cups with coushion-tipped underwire for support and comfort.
- Comfort straps prevent shoulder irritation and reduce strain.

Fitter's Comments

Call Me Now

- Floral satin minimizer with comfort straps.
- Underwire minimizer reduces up to 1-3/4".
- Back panels are breathable.
- Side seams are 3-1/2" wide.
- Contoured and padded 3/4" straps adjust in back.
- Three row, three column hook and eye closure.

FIG. 10

HerRoom.com

LINGERIE WE BUY FOR OURSELVES

Bras  Panty wear  Slips & More  Shape wear  Maternity  Accessories  HisRoom

CHOOSE A GIFT

Push-up Bra, Thong and Garter
A unique combination of beautiful Swiss embroidery on a sheer tulle gives a look of sensuality, elegance and femininity. The add-a-size push-up underwire bra gives a woman the ultimate cleavage, increasing her size by one full cup size. 32A-36C.

Embroidered Bra
Embroidered Thong
Garter Belt $73.00   [Buy]

Full Busted Bra and Panty
Featuring exquisite quipure embroidery from Switzerland, the beautiful pattern of lace enhances the design of this gift set. This is a dream come true for the full busted woman. Deep plunging sensuous neckline. 32C-44DD Full Busted Bra
Lace Front Bikini $64.00   [Buy]

Demi Bustier and Panty
A very sexy piece for a very sexy woman. Sheer lace front panels for peek-a-boo effect. Flared hip cut for added sensuality. Perfectly hidden wires for smoothness and support. This beautiful garment may also be worn as an outer piece. 34B-36D.

Hidden Wire Bustier
Lace Front Bikini $98.00   [Buy]

Push Up Bra, Thong and Garterbelt
A fashion basic that lifts your spirits and enhances your imagination. Beautiful floral embroidery on tulle makes you feel elegant and sexy! Add a size push up gives a woman the ultimate in cleavage. 32A-36C.

Garter Belt
Embroidered Thong
Demi Bra $72.00   [Buy]

More...

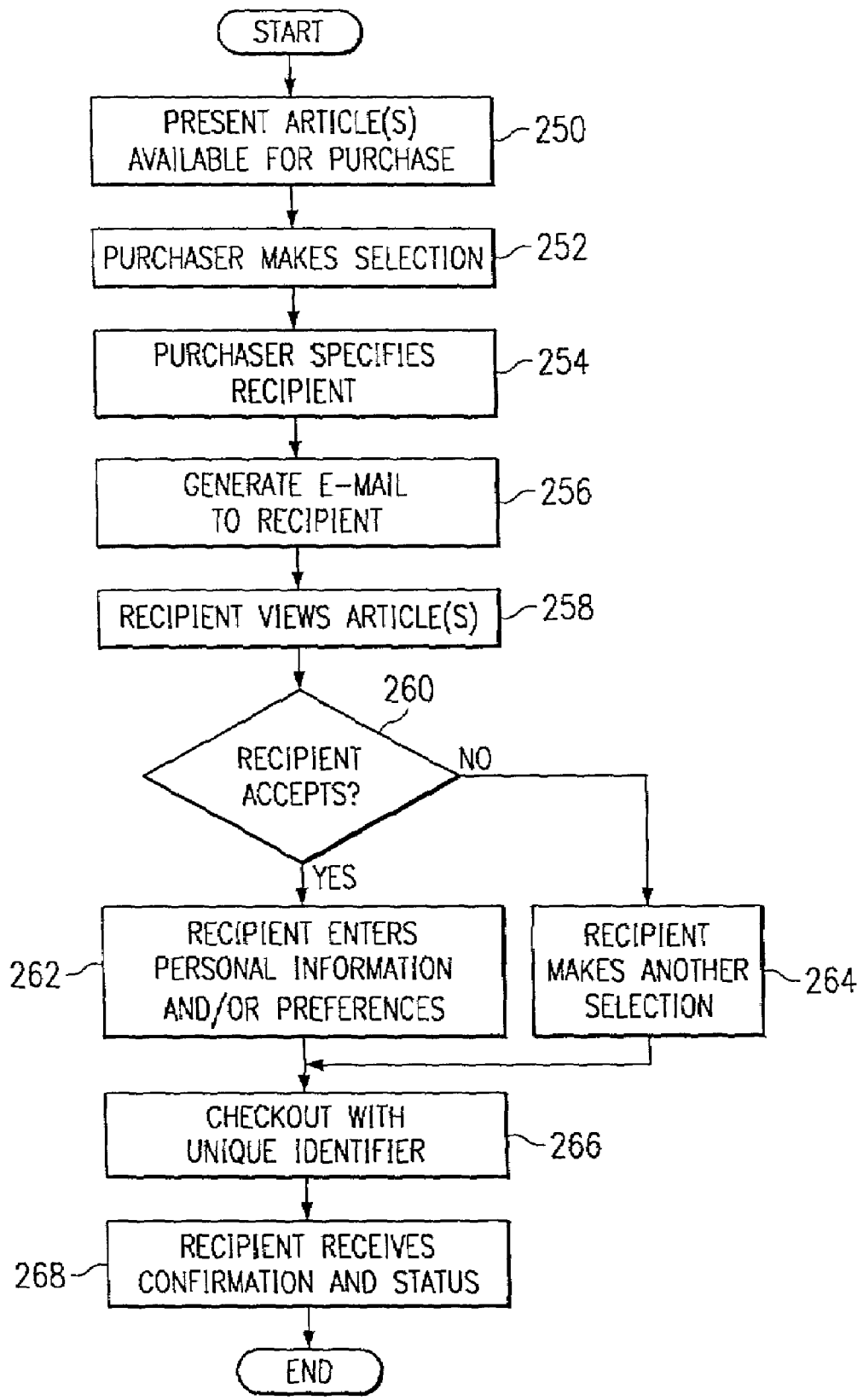

VIRTUAL SHOWROOM SYSTEM AND METHOD

RELATED APPLICATION

This application is a continuation-in-part of U.S. patent application Ser. No. 09/564,372 filed May 2, 2000 entitled Virtual Showroom System and Method.

TECHNICAL FIELD OF THE INVENTION

The present invention relates generally to electronic commerce and, in particular, to a virtual showroom system and method.

BACKGROUND OF THE INVENTION

The recent increase in PC owners and simplified access to the Internet and other "dial-up" network services have provided enhanced opportunities for on-line sales. E-commerce, in the form of business to business and business to consumer sales has become the method of choice for many buyers and sellers of services and merchandise. Furthermore, improved video graphics allow buyers to view and evaluate potential purchases more thoroughly, prior to purchase. Many buyers remain cautious, however, and avoid on-line purchases involving tangible, personal products which traditionally require a more thorough, in-person inspection. Existing technology does not provide a buyer with sufficient opportunity to adequately evaluate such items prior to purchase.

SUMMARY OF THE INVENTION

The present invention provides a system and method for a virtual showroom and performing transactions associated therewith. More particularly, a method for conducting a transaction may include presenting a plurality of gift sets to a purchaser, wherein each gift set comprises a plurality of articles. A selection may be received from the purchaser, the selection including at least one of the plurality of gift sets. The method may also include receiving identification information regarding a recipient of the gift set. In a particular embodiment, a notification including a unique identifier is issued to the recipient. If the recipient accepts the gift set, delivery of the selection to the recipient is scheduled.

In accordance with another embodiment, the recipient may be allowed to select an alternative item if the recipient rejects the selection. The recipient may be charged at least a portion of a price difference between the alternative item and the selection.

A technical advantage of a particular embodiment of the present invention includes a method for performing a transaction in which a purchaser is provided a plurality of gift sets and allowed to make a proposed selection for a recipient. The recipient receives a notification with the selection of the purchaser and may accept or reject the selection. If the recipient rejects the selection, the recipient may be allowed to select an alternative item.

Another technical advantage includes a method for performing a transaction in which a purchaser may select a particular gift set from a plurality of gift sets, for a recipient. The purchaser may select from particular specific criteria regarding the gift set. However, the purchaser may leave some or all of the specific criteria for selection by the recipient.

Other technical advantages are readily apparent to one skilled in the art from the following figures, description, and claims.

BRIEF DESCRIPTION OF THE DRAWINGS

For a more complete understanding of the present invention, and for further features and advantages, reference is now made to the following description, taken in conjunction with the accompanying drawings, in which:

FIG. 3A is a schematic drawing illustrating another alternative embodiment of the virtual showroom of FIG. 2;

FIG. 5 is a schematic drawing illustrating another alternative embodiment to the virtual showroom of FIG. 2;

FIG. 10 is a schematic drawing illustrating a virtual showroom, in accordance with a particular embodiment of the present invention; and FIG. 11 is a logic diagram illustrating a method for performing a transaction, in accordance with a particular embodiment of the present invention.

DETAILED DESCRIPTION OF THE INVENTION

Figure 1:
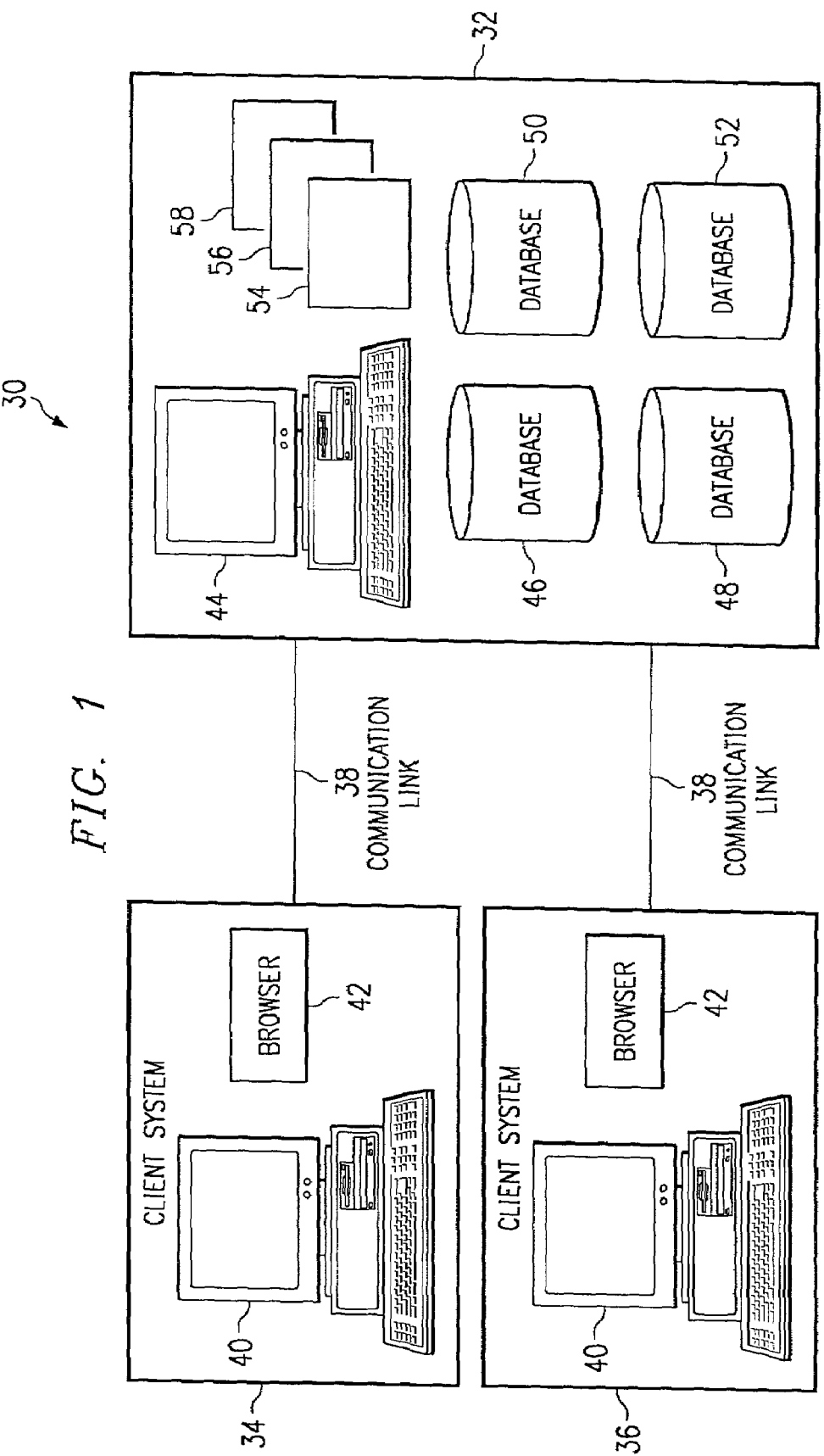
FIG. 1 is a schematic drawing illustrating a computer network configuration suitable for use within one aspect of the present invention.

Referring to FIG. 1, a computer network is provided and generally designated by the reference numeral 30. Network 30 includes a network server 32 and a plurality of client systems 34 and 36. Each client system 34, 36 may be coupled with network server 32 via respective communication links 38. In one embodiment, network server 32 may include, and/or be coupled with an internet or, more particularly, the World Wide Web. However, network server 32 may also include and/or be coupled with any "dial-up" service provider. In general, network server 32 may be any platform which allows a user of client system 34 and/or 36 to electronically communicate with network server 32 through communication link 38.

Client systems 34 and 36 each include a respective computer terminal 40, or other medium for accomplishing electronic communication. Terminal 40 may include specific software including a browser 42 which allows standardized communication with network server 32.

Communication link 38 may include practically any available communication system including, but not limited to wireless, wireline, twisted pair, coaxial cable, T1, and/or digital subscriber lines (DSLs). The present invention will primarily be described with regard to web pages viewed by the user of a personal computer (PC) in communication with a network server of the World Wide Web. It will be recognized by those of ordinary skill in the art that the teachings of the present invention apply equally as well with any form of electronic communication between computer systems. Similarly, any reference to a web page shall include any interactive display available to a user of a network server.

In the illustrated embodiment, network server 32 includes a graphical user interface (GUI) 44 to allow a network operator to monitor server 32, perform data entry functions, programming, and communicate with users of network server 32. One or more databases 46, 48, 50 and 52 may also be provided in order to store particular information including inventory, customer information, accounting information, product descriptions, etc. Network server 32 may also include software, and a plurality of web pages 54, 56 and 58 in order to communicate with and/or display information to users of client systems 34 and 36. Web pages 54, 56 and 58 may contain dynamic content, such that the contents of a given web page may change over time, or in response to an electronic request and/or selection by a user. Alternatively, the content of web pages 54, 56 and 58 may change automatically according to parameters received from server 32 or an operator of server 32.

Figure 2:
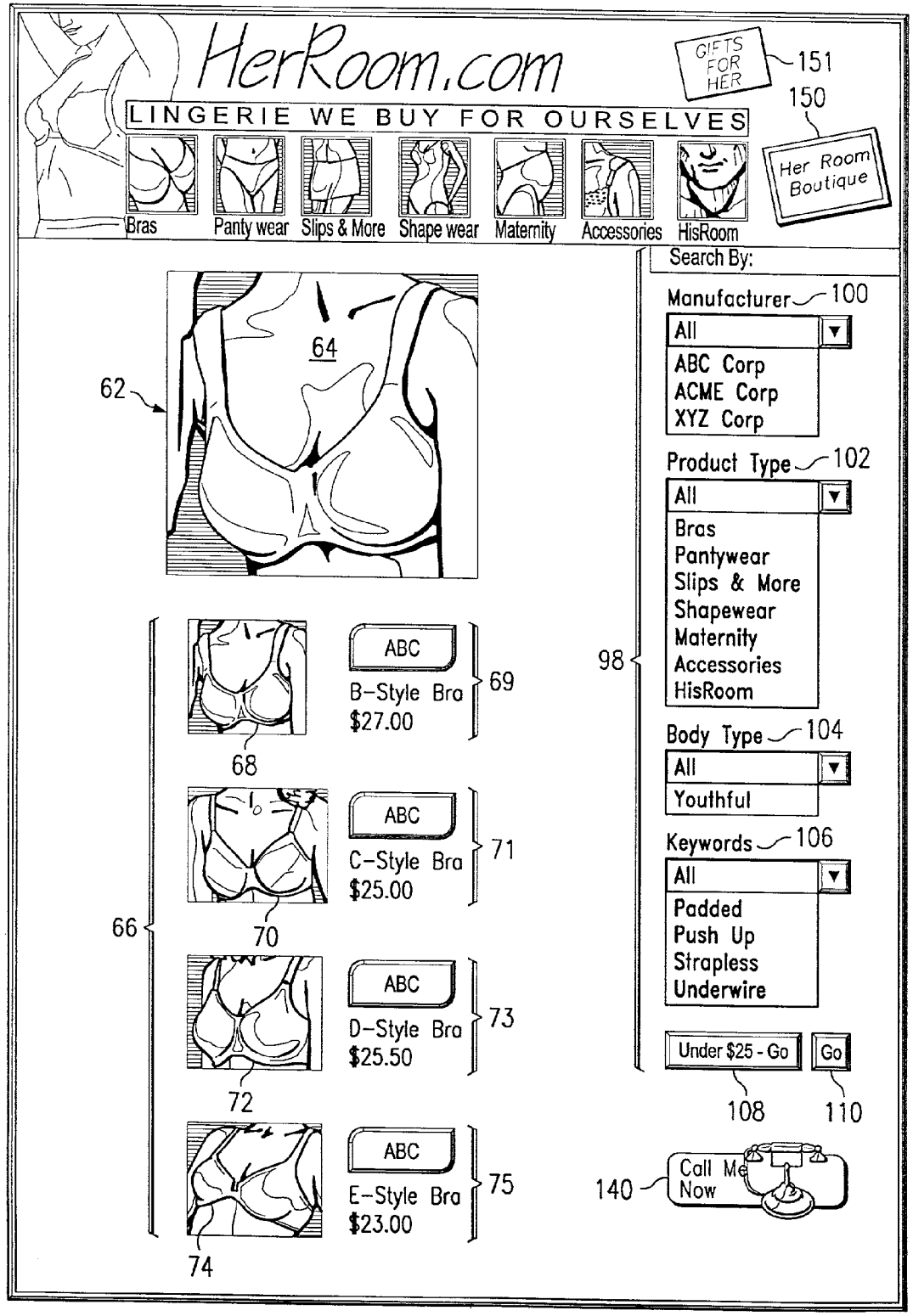
FIG. 2 is a schematic drawing illustrating a virtual showroom suitable for use within the teachings of the present invention.

In one embodiment, network server 32 may be operated by a seller of articles of clothing including, but not limited to bras, pantywear, slips, shapewear, maternity clothing, accessories, shirts, pants and outer wear. Referring to FIG. 2, web page 54 may include a virtual showroom 60 containing product information and electronic images of these various articles. Virtual showroom 60 includes a master display field 62 capable of displaying a large electronic image, for example, image 64. Throughout this application, reference will be made to products, articles, garments, undergarments, outer wear and other tangible items contained within web pages and, more specifically, a virtual showroom. It will be recognized by those of ordinary skill in the art that such reference will indicate an electronic image of the associated tangible item displayed on the web pages, rather than the item itself.

Web page 54 includes a search field 98 which provides a user with various search criteria, to assist the user in finding particular articles and products of interest. For example, a user of network server 32 may select one of icons 100, 102, 104 or 106 to conduct a search specific to a particular manufacturer 100, product type 102, body type 104 or a keyword search 106. Each icon 100, 102, 104 and 106 includes a respective field of pre-selected terms available to a user for conducting a search. In one embodiment, an "under $25—go" icon 108 may also be provided. A user may select one or more of various search criterion 100, 102, 104 or 106 to conduct a specific search as desired by the user. In order to execute the search, the user needs only select the "GO" icon 110 and server 32 will search database 46, 48, 50 and/or 52 (FIG. 1) for articles matching the specified criteria. Alternatively, after specifying search criterion from fields 100, 102, 104 and/or 106, the user may select "under $25—GO" icon 108. This will automatically add to the search criterion that the price of the articles or products must be equal to, or less than $25. Accordingly, network server 32 will search databases 46, 48, 50 and/or 52 for articles or products which match the criteria of fields 100, 102, 104 and/or 106, and include a price equal to or less than $25.

In a particular embodiment of the present invention, a user may select one of many images to be displayed within master display field 62. For example, a display field 66 featuring various electronic images of various articles may be provided and may include undergarments 68, 70, 72 and 74, with associated product descriptions 69, 71, 73 and 75. This allows a user to view thumbnail electronic images of undergarments 68, 70, 72 and 74, and review various details regarding each particular product contained within product descriptions 69, 71, 73 and 75. A user may select one of undergarments 68, 70, 72 and 74, for display within master display field 62 by "clicking on" the graphical object, or icon which represent any of undergarments 68, 70, 72 and 74. Once a user "clicks" upon a particular undergarment, that particular undergarment becomes the featured undergarment, and a larger electronic image of the featured undergarment is displayed within master display field 62. For example, master display field 62 may originally be left blank when web page 54 is displayed to the user. Upon selection of a featured undergarment, for example undergarment 68, a larger electronic image representing undergarment 68 may be displayed within master display field 62. This provides the user with a larger image in order to more thoroughly evaluate the featured undergarment.

A large product description field 72 (FIG. 4) may also be provided. When a user selects a featured article, for example undergarment 68, a thorough description of undergarment 68 may appear within product description field 77. The product description field provides more detailed information regarding a given article than available through product descriptions 69, 71, 73 and 75.

In the illustrated embodiment, the undergarment displayed within master display field 62 is depicted upon a mannequin or human form. This allows a user of server 32 to evaluate the undergarment more thoroughly. In another embodiment, an actual photograph or other depiction of a human may be used within display field 62, to illustrate a particle article (i.e., undergarment 68).

Figure 2A:
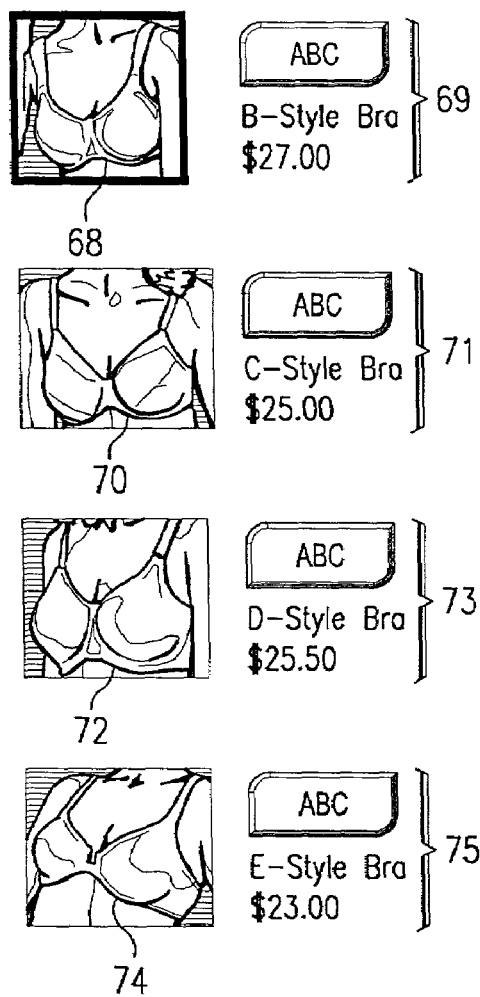
FIG. 2A is a schematic drawing illustrating a display field containing graphical objects.

Field 66 may include a method to distinguish the featured, or selected undergarment 68, with a distinctive characteristic from the non-featured undergarments. In the example described above, undergarment 68 would be considered the featured undergarment and displayed within master display field 62. Accordingly, undergarments 70, 72 and 74 would be considered the non-featured electronic thumbnail images. In order to distinguish undergarment 68 from non-featured undergarments 70, 72 and 74, the thumbnail image of undergarment 68 may be provided in a different color scheme, for example, black and white and/or shaded, to indicate the selection of undergarment 68 as the featured image. In the same embodiment, undergarments 70, 72 and 74 may be provided in color. Alternatively, featured undergarment 68 may be provided in color, to indicate its selection as the featured image, and non-featured undergarments 70, 72 and 74 may be provided in black and white. FIG. 2A illustrates a method to distinguish featured undergarment 68 from non-featured undergarments 70, 72 and 74, using shading.

Figure 2B:
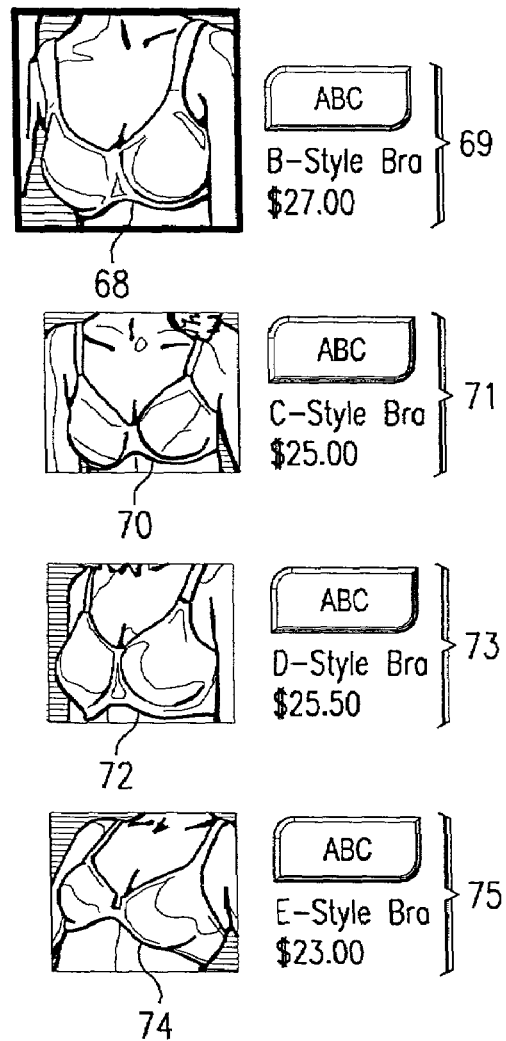
FIG. 2B is a schematic drawing illustrating an alternative embodiment display field.

In yet another embodiment, featured undergarment 68 may include another distinctive characteristic, instead of its associated color scheme. For example, the electronic thumbnail image of featured undergarment 68 may be provided in a size larger than electronic thumbnail images of undergarments 70, 72 and 74 within field 66 (see FIG. 2B). This allows a user to view field 66 and immediately determine which undergarment is the featured undergarment currently being displayed within master display field 62. Alternatively, the size of featured undergarment 68 may be reduced with respect to undergarments 70, 72 and 74 within field 66, after selection of undergarment 68 as the featured image.

Customer support provided by the operator of network server 32 is imperative to the successful operation and maintenance of virtual showroom 60. Accordingly, an icon entitled "call me now" 140 may be provided upon web page 54. Selection by the user of the "call me now" icon 140 will immediately initiate a message to the operator indicating that the user requires customer support. In one embodiment, this allows the operator to immediately place a telephone call to the user to address any questions or comments of the user. Personal information regarding each particular user including, but not limited to telephone number, name, age and preferences may be stored within any of databases 46, 48, 50 and/or 52 and made available to the operator immediately upon selection of the "call me now" icon 140, by the user.

Figure 3:
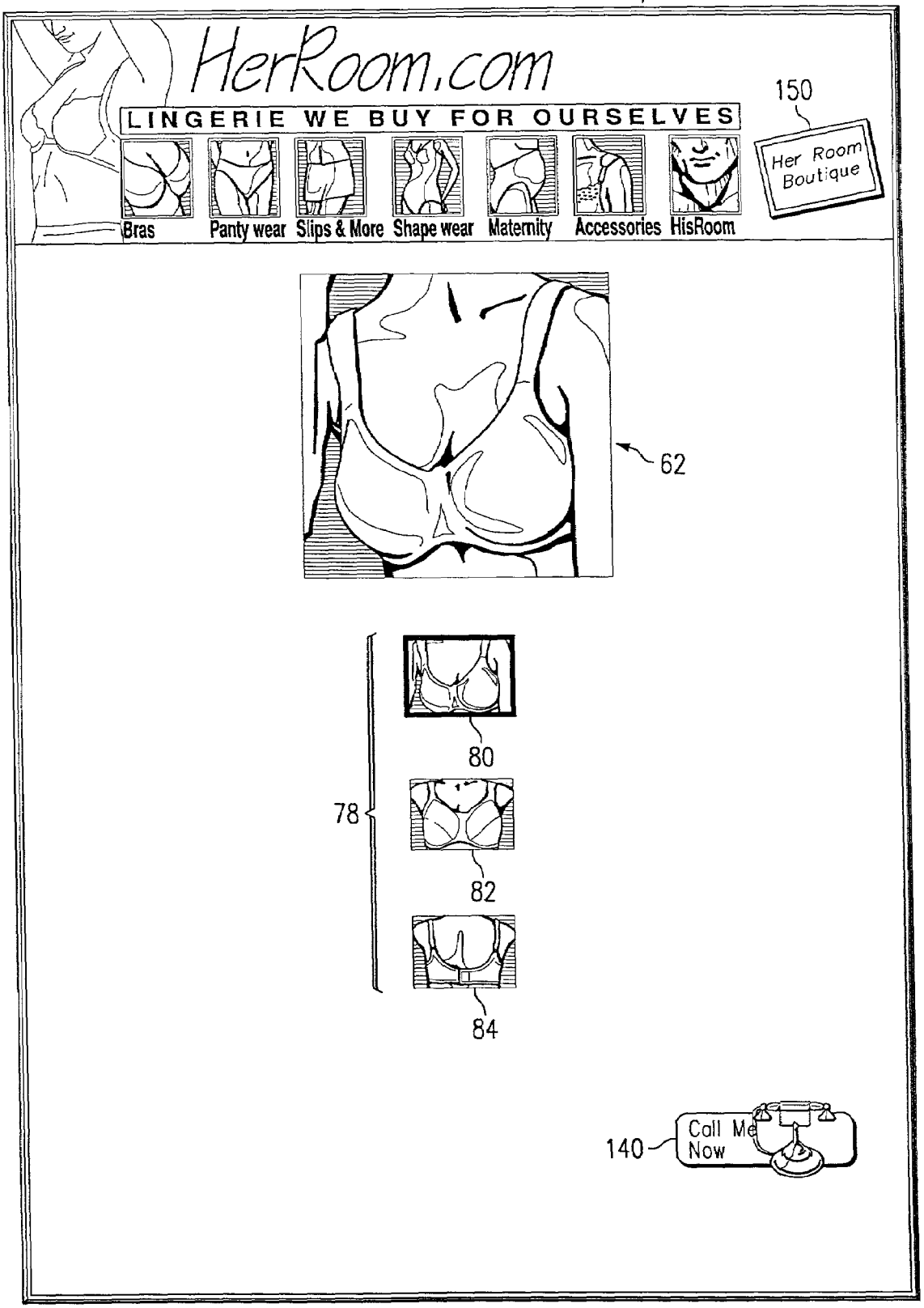
FIG. 3 is a schematic drawing illustrating an alternative embodiment of the virtual showroom of FIG. 2.

Referring now to FIGS. 2 and 3, a second field 78 including electronic thumbnail images 80, 82 and 84, each thumbnail image representing a different view of the same article, may also be provided. For example, electronic thumbnail image 80 may portray a front view of a particular article, while electronic thumbnail images 82 and 84 include rear and side (off-center) views of the same article. Once a user has selected a particular article based upon electronic thumbnail images 68, 70, 72 and 74, and their respective associated product descriptions 69, 71, 73 and 75, a particular product may be displayed within master display field 62. Accordingly, electronic thumbnail images 80, 82 and 84 may represent various views of whichever article that is being displayed within master display field 62.

In a particular embodiment, when an article is selected from field 66 to be displayed in master display field 62, a default command may cause a front view of the selected article to be displayed within master display field 62. A user may then view various other views of the same article by clicking upon thumbnail images 80, 82 and 84 in order to gain a more thorough perspective of the product. In practice, a user may select electronic thumbnail image 82 which portrays a rear view of a particular product, and the rear view of that product will be displayed within master display field 62. In this case, rear view electronic thumbnail image 82 will be considered the featured, or selected view. In a similar manner, the views depicted by electronic thumbnail images 80 and 84 would be considered non-featured images of field 78. In a similar manner to that described above with respect to featured electronic thumbnail image 68, electronic thumbnail image 82 may also include a distinctive characteristic in order to indicate that it is currently the featured electronic thumbnail image of field 78. The distinctive characteristic may also include various color schemes or the size of the particular thumbnail images, as described above. In the embodiment of FIG. 3, electronic thumbnail image 80 is the featured image, and displayed within master display field 62.

At any time while viewing web page 54, the user may change the electronic thumbnail image currently being displayed within master display field 62, simply by clicking upon a different image, for example one of undergarments 70, 72 or 74. If the user clicks on undergarment 74, for example, undergarment 74 would be displayed within master display field 62, instead of undergarment 68. Accordingly, undergarment 74 would become the featured electronic thumbnail image, and undergarments 68, 70 and 72 would be considered non-featured thumbnail images. Upon selection of undergarment 74 by a user, rear, front and side views of undergarment 74 would automatically be displayed within field 78. In a similar manner, a user may change the perspective view of the product being displayed within master display field 62 by clicking on a different electronic thumbnail image 80 or 82. If a user selected electronic thumbnail image 82, for example, the view associated with electronic thumbnail image 82 would be displayed within master display field 62. Thus, electronic thumbnail image 82 would become the featured image, and images 80 and 84 would be considered non-featured thumbnail images.

A text display field indicating "fitters comments" 87 may also be provided to assist the user in evaluating the featured undergarment displayed within master display field 62. Fitters comments 87 provide a subjective analysis of the featured product which may not otherwise be available by viewing an electronic image. Fitters comments 87 may include an analysis of a particular article from the manufacturer, supplier, network operator and/or any other clothing professional. As illustrated in FIG. 3A, fitters comments may indicate particular qualities including, but not limited to, configuration, comfort, fabric analysis, measurements, operation and/or accessories.

Information regarding the manufacturer of the featured undergarment displayed within master display field 62 may also be provided in a text display field entitled company information 85 (FIG. 3A). This information may be stored within any of databases 46, 48, 50 and/or 52 (FIG. 1), and automatically made available to the user through the company information text field 85, upon selection of a featured article. Information regarding the manufacturer of a particular article may be useful to a user in evaluating a particular product, and may also provide information regarding the history, customer service, statistical data, and reputation of the manufacturer of the product.

Figure 3B:
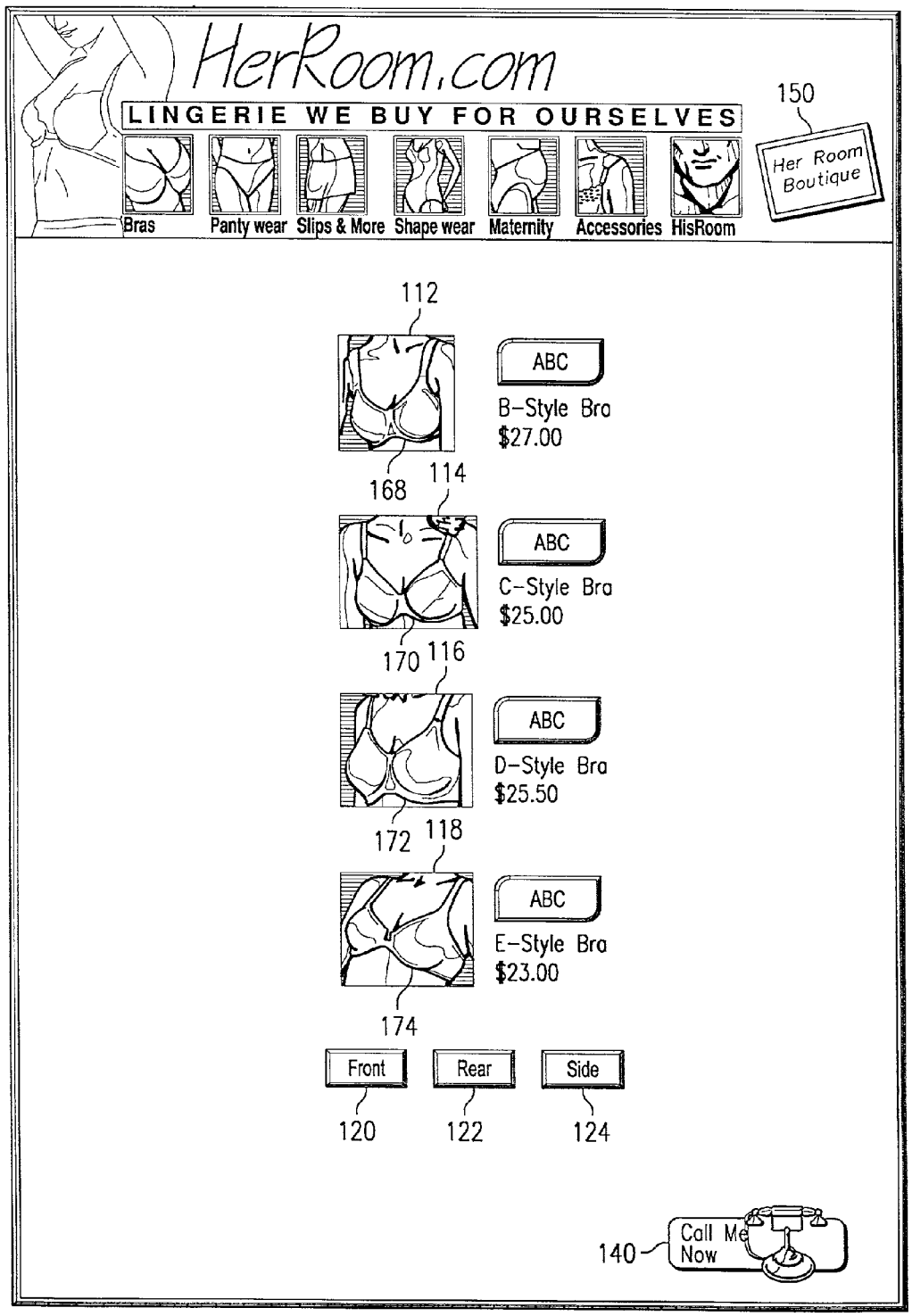
FIG. 3B is a schematic drawing illustrating another alternative embodiment of the virtual showroom of FIG. 2.
Figure 3C:
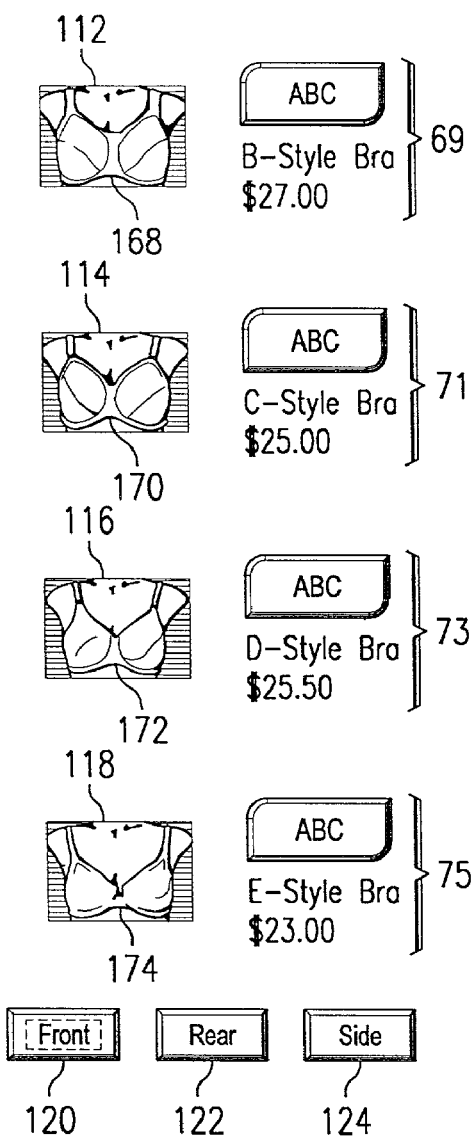
FIG. 3C is a schematic drawing illustrating a display field for use with the virtual showroom of FIG. 2.

Web page 54 may also provide a user with the ability to view a plurality of garments from several similar perspectives, simultaneously. As illustrated in FIG. 3B, a plurality of display windows 112, 114, 116 and 118, may be provided. A user who is evaluating certain articles, may select certain articles for display within display windows 112, 114, 116 and 118. For example, a user may select electronic images of undergarments 168, 170, 172 and 174 for display within windows 112, 114, 116 and 118, respectively. Initially, each undergarment 168, 170, 172 and 174 may be displayed from a side, or isometric type perspective, as depicted in FIG. 3B. A plurality of icons indicating front 120, rear 122, and side 124 are also provided. A user has the option of viewing any associated perspective of undergarments 168, 170, 172 and 174, simultaneously, upon selection of any one of front icon 120, rear icon 122, and side icon 124.

Figure 3D:
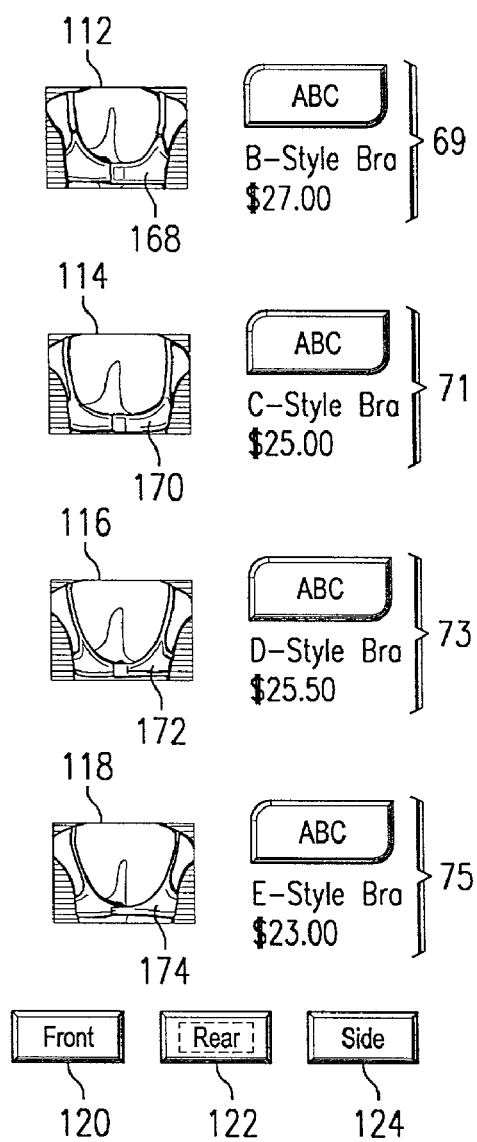
FIG. 3D is a schematic drawing illustrating an alternative embodiment display field for use with the virtual showroom of FIG. 2.

In practice, after a user has selected undergarments 168, 170, 172 and 174 for viewing within display windows 112, 114, 116 and 118, respectively, a default view illustrating the front perspective of each undergarment 168, 170, 172 and 174 may be provided. Upon selection of a different perspective, for example, rear icon 122, a rear perspective of each undergarment 168, 170, 172 and 174 will be provided, simultaneously, as illustrated in FIG. 3D. Similarly, a user may select any of front, rear, and side perspectives and that particular perspective of each undergarment 168, 170, 172 and 174 will be displayed within their associated display windows 112, 114, 116 and 118, respectively. This feature allows a user to simultaneously display and evaluate a plurality of undergarments from different perspectives.

Figure 4:
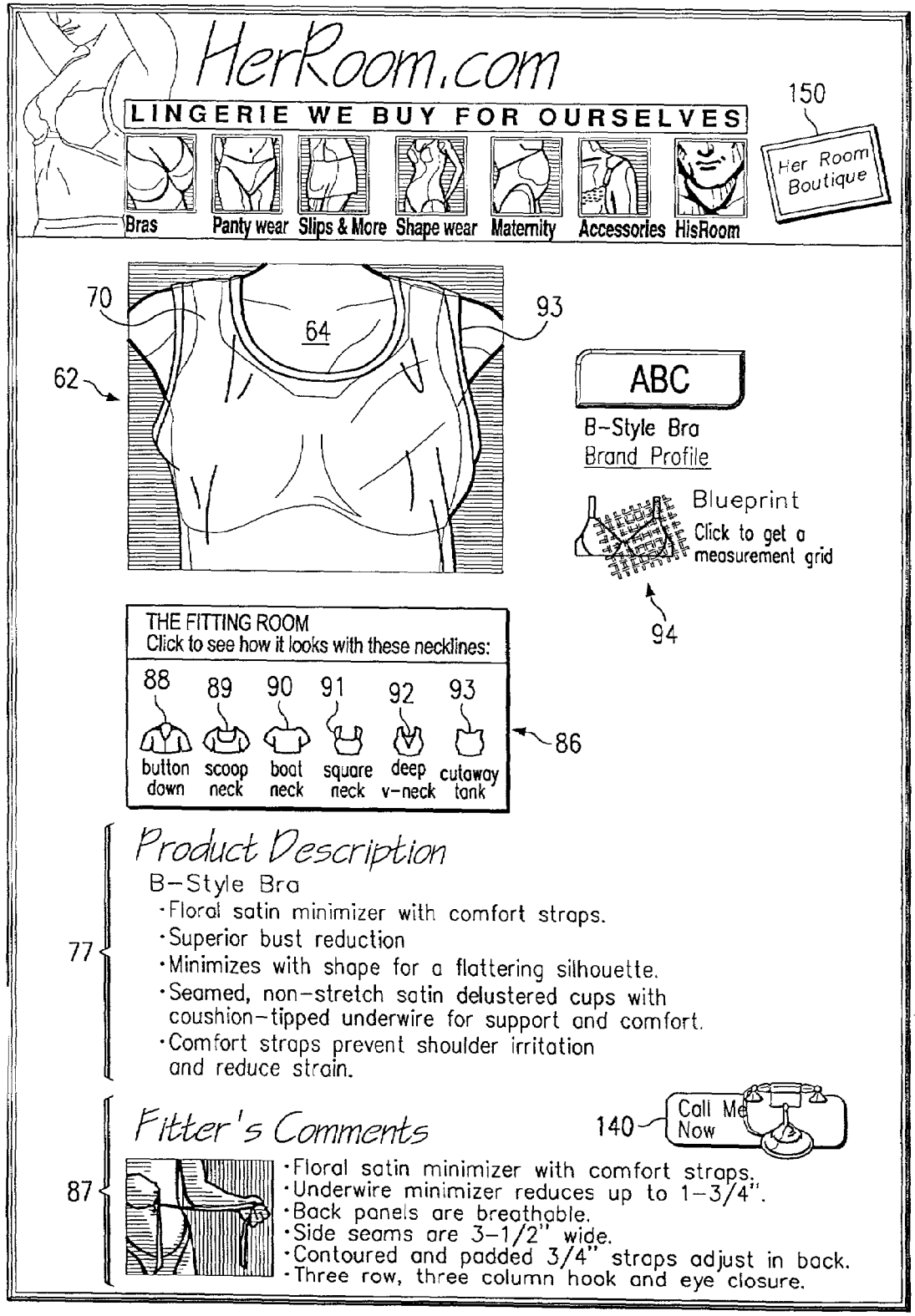
FIG. 4 is a schematic drawing illustrating another alternative embodiment to the virtual showroom of FIG. 2.

Referring to FIGS. 4 and 5, a fourth field 86 representing various complementary articles, or articles which may be worn with, or over the product being displayed within master display field 62 may be provided. For example, outer garments 88–93 each includes distinctive characteristics, for example neck-line, sleeve length, and sleeve location. A user of web page 54 may click on one of outer garments 88–93 of field 86 in order to select a particular type of clothing to view concurrently with any of undergarments 68, 70, 72 and 74. In one embodiment, a user may select the electronic thumbnail image of undergarment 70 for display within master display field 62. This will cause an enlarged image of undergarment 70 to appear as electronic image 64. Next, a user may select any of field 86, for example outer garment 93 which illustrates a "cutaway tank" shirt. Once selected, an electronic image of article 93 will overlay the electronic image of undergarment 68 within master display field 62, as illustrated in FIG. 4. A user may then select any of the remaining outer garments 88–92, in order to replace the image of outer garment 93 within master display field 62, with another overlay image of one of outer garments 88–92. Through this specification, the terms overlap and overlaying should not be limited to placing a specific image over another specific image, or vice versa. Many techniques are available to combine electronic images in a manner traditionally referred to as an overlay image. Overlaying simply refers to arranging two or more electronic images together such that certain characteristics from each image are visible within an electronic display.

A user may continue in this fashion selecting any of articles 88–93 within field 86 for display within master display field 62. As previously discussed with regard to field 66 and field 78, outer undergarments 88–93 of field 86 may include a distinctive characteristic in order to distinguish the selected, or featured outer garment 93 from the remaining non-featured outer undergarments 88–92. The distinctive characteristic may include the featured outer undergarment 93 appearing in a different size than the non-featured outer garments 88–92. Alternatively, a different color scheme may be provided for all non-featured outer garments 88–92, with respect to the featured article.

In still another embodiment, the selection of one of outer garments 88–93 from field 86 by a user will provide a "line drawing" 88a illustrating an outline of the featured outer garment from field 86, overlaying the product within master display field 62 (FIG. 5). Line drawing 88a allows a user to fully evaluate certain characteristics inherent with the featured outer garment from field 86 with regard to the featured undergarment displayed within master display field 62, and does not require that a full image of the featured outer garment from field 86 be displayed within master display field 62. Accordingly, a user may evaluate the coordinated image of the undergarment and line drawing to determine critical characteristics including strap location, strap width, neckline, sleeve location and sleeve length to determine the suitability of a particular undergarment with a particular outer garment. FIG. 5 illustrates a line drawing 88a of featured outer garment 88 overlaying featured undergarment 68 within master display field 62.

Figure 6:
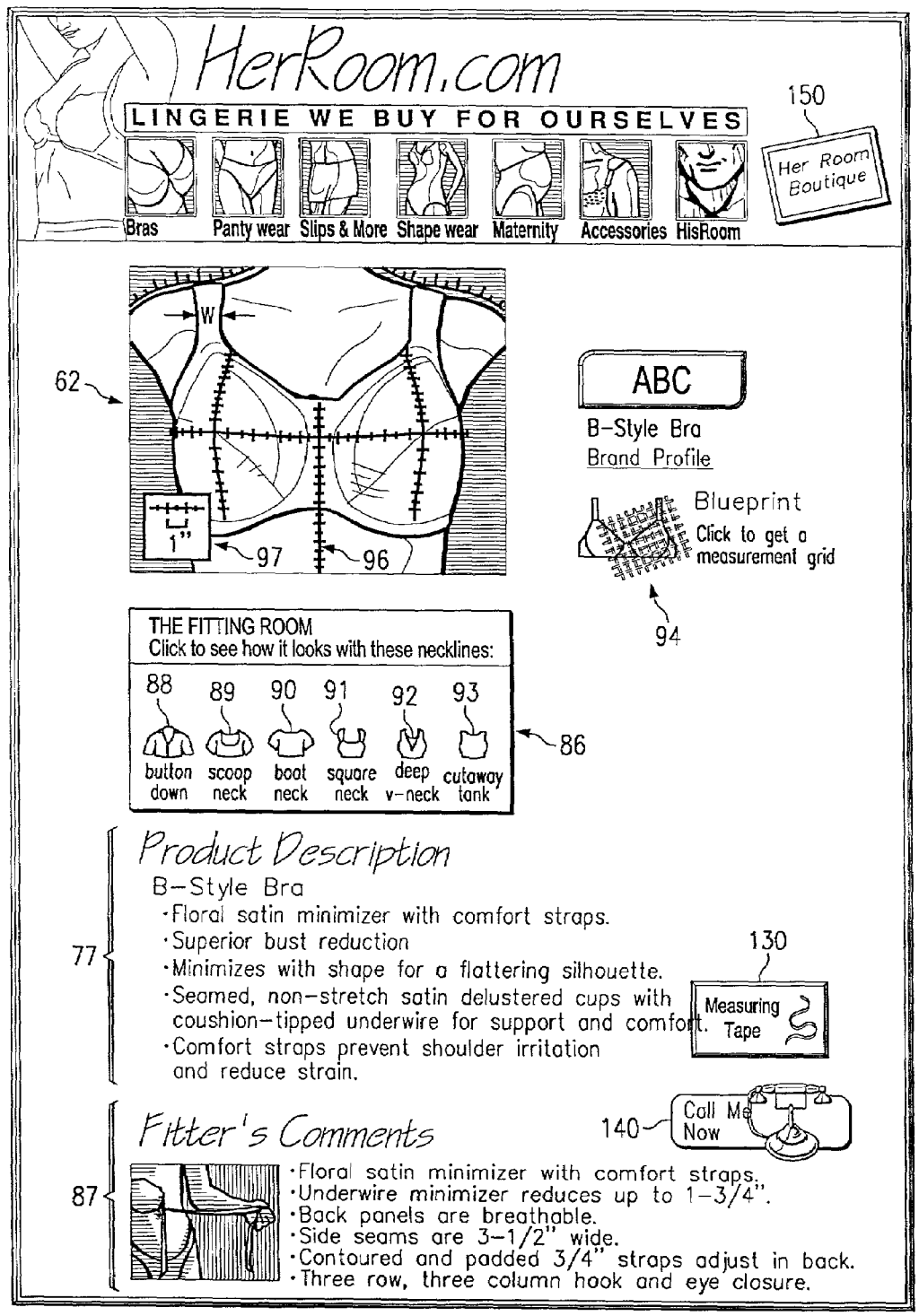
FIG. 6 is a schematic drawing illustrating an alternative embodiment to the virtual showroom of FIG. 2.

Referring now to FIG. 6, web page 54 may also include an icon entitled "blueprint" and generally designated by the reference numeral 94. Selection of blueprint icon 94 by a user will provide a blueprint, scaled-map 96 overlaying any image within master display field 62. Scaled map 96 conforms to critical contours of the particular article it overlays. For example, scaled map 96 follows the contours of the human shoulder for simplified evaluation of strap width W of the illustrated article. Furthermore, scaled map 96 provides a three-dimensional image which allows a user to determine depth, for example, the protrusions at the "cups" of the illustrated bra. Overall, this allows a user to evaluate measurements of various article characteristics including, but not limited to, sleeve length and strap width. A scale 97 may also be provided to illustrate the exact dimensions associated with scaled map 96.

In one embodiment scaled map 96 may be aligned with and tailored to the particular article being displayed within master display field 62. This ensures that various benchmarks within scaled map 96 line up appropriately with certain elements of the undergarment on display within master display field 62. Otherwise, blueprint scaled map 96 may be provided in a generic scale or grid, suitable to evaluate any article displayed within master display field 62.

Figure 7:
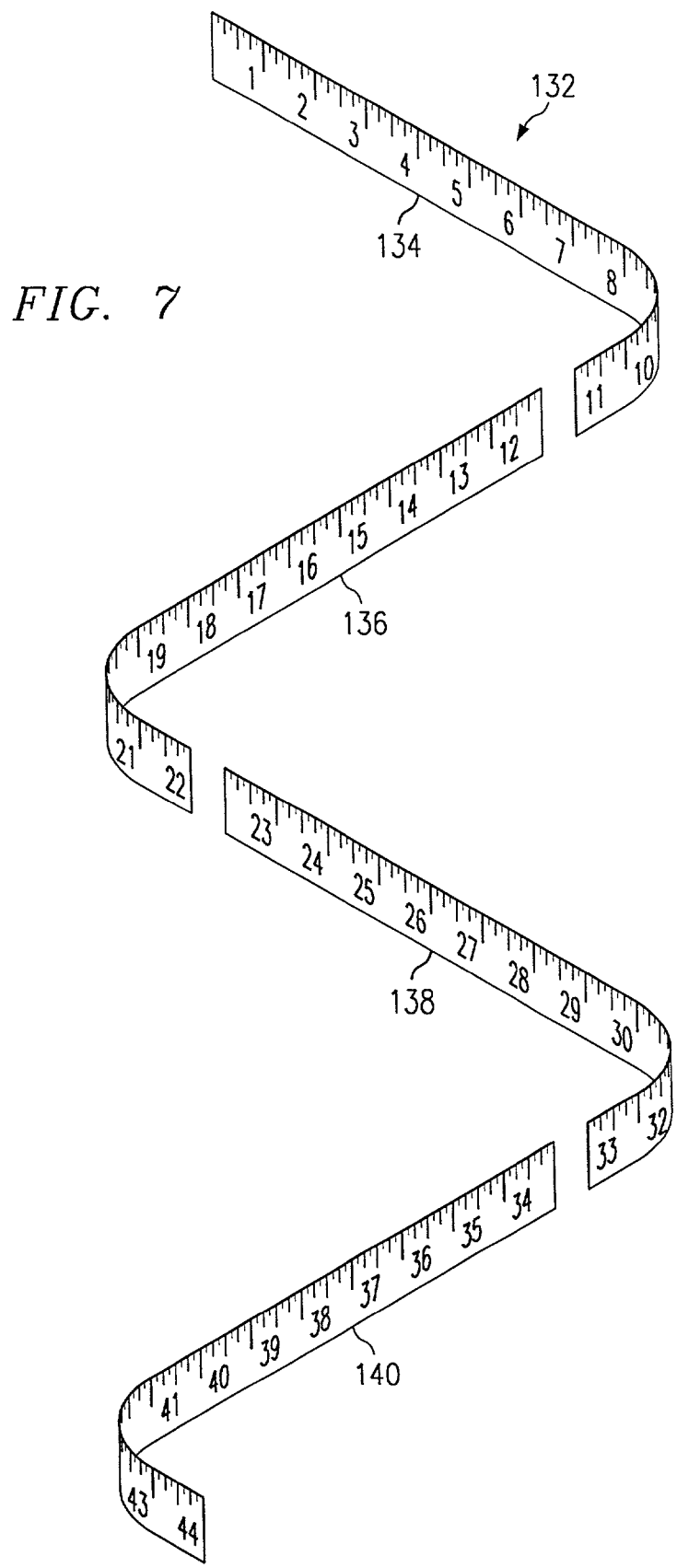
FIG. 7 is a schematic drawing illustrating a tape measure for use within the teachings of the present invention.
Figure 8:
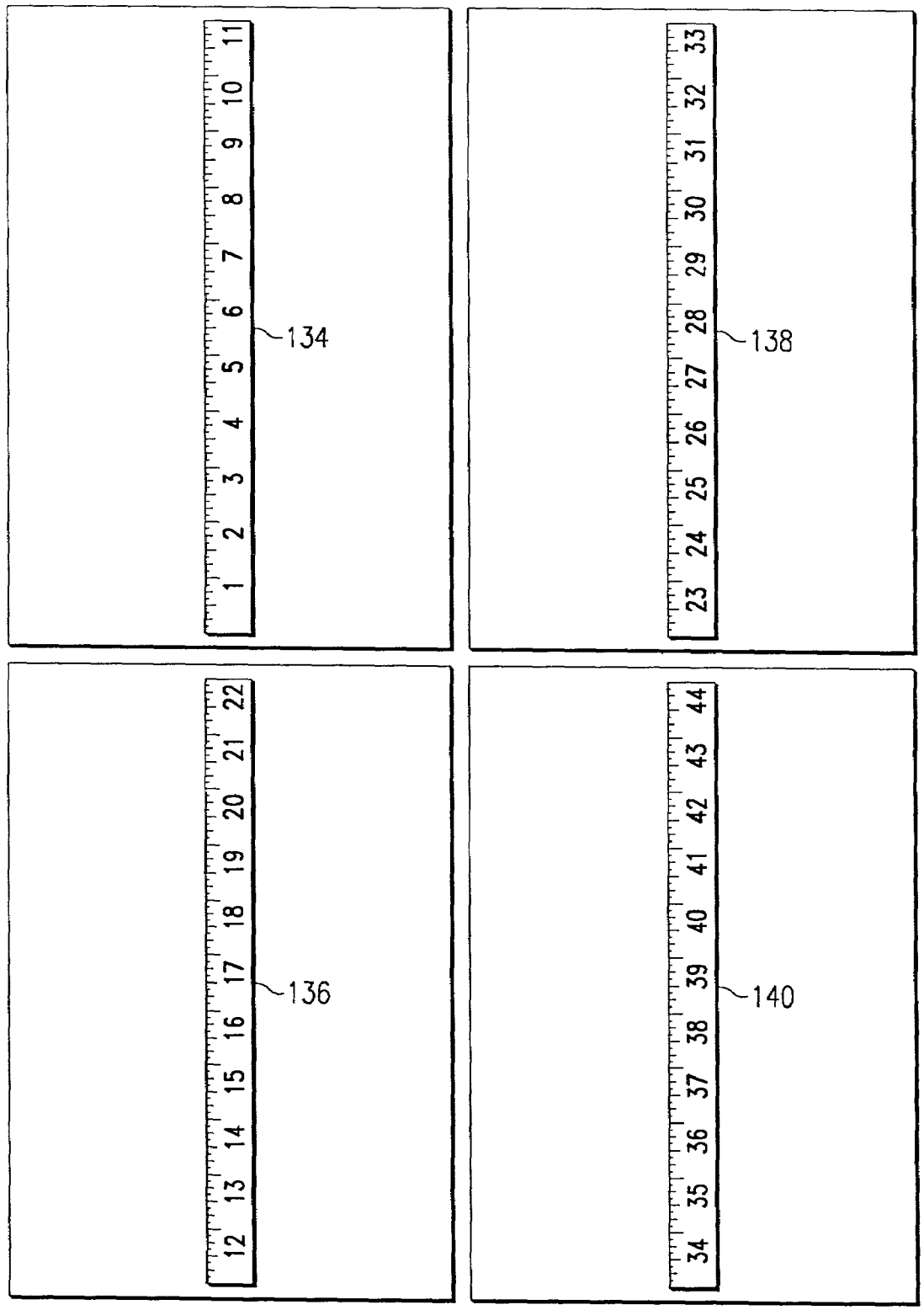
FIG. 8 is a schematic drawing illustrating portions of the tape measure of FIG. 7.
Figure 9:
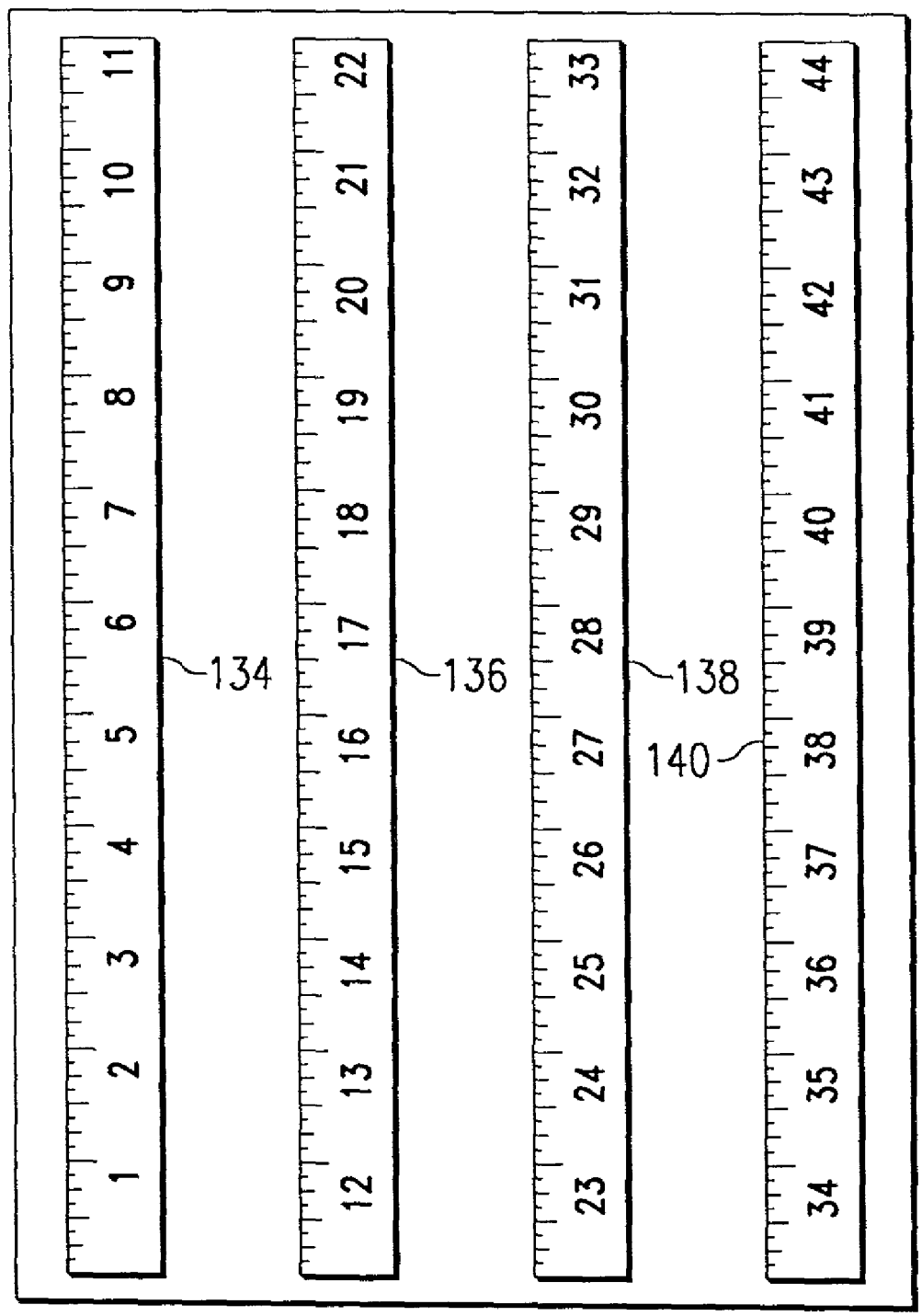
FIG. 9 is a schematic drawing illustrating an alternative embodiment to the sections of tape measure of FIG. 8.

Certain physical characteristics and measurements of a particular user are very important in their selection and evaluation of any particular product. Accordingly, web page 54 provides the ability of the user to print out a hard copy of a scale, or tape measure in order to determine these physical characteristics and measurements. A graphical object entitled measuring tape 130 is available to the user. Selection of measuring tape icon 130 will distribute an electronic image of a tape measure 132 of an appropriate scale to perform this evaluation, for printing by the user. FIG. 7 illustrates one particular embodiment of the printable tape measure 132 available to the user. In order to extend the length of tape measure 131, sections 134, 136, 138 and 140 of tape measure 132 may appear on consecutive pages for assembly by the user, as illustrated in FIG. 8. In another embodiment, sections 134, 136 and 138 of tape measure 132 may appear on a single page (FIG. 9). In this embodiment, a user may "cut and paste" sections 134, 136 and 138 together to form tape measure 132.

As previously discussed, databases 46, 48, 50 and 52 (FIG. 1) may be used to store information regarding sales, accounting, user profiles, manufacturers, products and security. By collecting, storing and utilizing information regarding particular users, the operator of network server 32 may optimize sales techniques, and offer methods of electronic commerce previously unavailable. For example, each time a user purchases a particular article, the user's information and profile of the particular article may be stored within a database, i.e., database 46. This information may then be used by the operator to notify the user, or purchaser of a particular product(s) regarding the occurrence of a specified event. In one embodiment, the operator may configure the network server to formulate a warning message whenever low inventory of a particular product is detected. Upon receiving this message, the network operator may initiate a message sequence wherein each purchaser of that particular product is notified that supply will be limited. In an alternative embodiment, network server 32 may be configured to contact the user directly, upon the occurrence of the particular event. This notification allows a user to purchase additional quantities of the particular product before the inventory is exhausted.

In a similar manner, the network operator may use this notification system to alert purchasers of a particular product that said product is being discontinued by the manufacturer and/or supplier. Upon receiving notification from the manufacturer and/or supplier, that a particular article will be discontinued or unavailable in the future, the network operator may initiate a message sequence wherein each purchaser of that product is notified. In the illustrated embodiment, an electronic message alerting each purchaser of the low inventory, or discontinuation status of the product, may be forwarded to each purchaser. In another embodiment, the network operator's notification to the purchaser may take the form of a telephone call prompted by network server 32 which furnishes the purchaser with a pre-recorded message regarding the status of the article. Alternatively, the network operator may place a live telephone call to the purchaser, or mail a hard copy notification of the status of the article.

In still another embodiment, the specified event may include a discounted price, or closeout sale of a particular article. Upon notification from the manufacturer to the network operator that a particular item will be subject to a closeout sale, or any discount, the network operator may provide each purchaser of the particular article with such information. Network server 32 may be pre-programmed to accept such information regarding a specified event for a particular product, including a closeout sale, low inventory or discontinuation. Upon receipt of such information, network server may be configured to automatically distribute notifications via electronic messages and/or pre-recorded telephone notification to each purchaser of the product. Each purchaser may be provided with the option to either participate or not participate in such promotions by subscribing or unsubscribing to such service via web page 54. For example, an icon(s) may be provided within web page 54 to allow the user to subscribe and/or cancel this service.

Each time a user of network server 32 purchases a particular item, the purchaser may be given the option to participate in a program wherein a replacement, or new article, or product will automatically be sent to the purchaser, at pre-selected time periods. This program works most effectively regarding disposable, at least partially fungible articles, which purchasers tend to replace over time. In one embodiment, this program may take the form of an "underwear club." Since purchasers tend to replace undergarments over time, and often prefer to re-purchase identical undergarments, this program provides for the automatic replacement of such articles.

In practice, the purchaser of an undergarment may receive notification of such program at the time of sale, or immediately thereafter. By specifying their preferred participation, network server 32 will automatically store price, quantities, and shipping information regarding the particular user and the selected undergarment. At pre-selected time periods, for example, each month, network server 32 may then send notification to the manufacturer, supplier and/or the network operator to ship a replacement undergarment. The purchasers account, or credit card, may then be charged as appropriate, for the replacement undergarment. Alternatively, network server 32 may automatically generate a billing statement which may be forwarded to the purchaser alerting them to the charges incurred.

In another embodiment, the network operator may provide a simplified system for a user to shop for gifts for other individuals. Undergarments and other personal articles of clothing are often difficult to purchase as gifts. Certain measurements, physical characteristics and subjective preferences inherent in an individual must be known by a third party in order for the third party to purchase gifts for the individual. Virtual showroom 60 provides a private and personalized method for a third party to purchase gifts for an individual.

For example, a husband shopping for his wife may be discouraged from purchasing a gift for his wife unless he knows all of her measurements, characteristics and preferences. In one embodiment of the present invention, the husband could select articles of a certain style and/or color for purchase, without specifying the size. Concurrently, with the purchase, network server 32 may prompt the husband to identify his wife by account number, if she is a user of virtual showroom 60, and/or telephone number, electronic-mail address, or physical address, if she is not.

Upon receipt of the order from the husband/purchaser, network server may automatically prompt an electronic message to be delivered to the wife/recipient, identifying the purchaser, the recipient, and the items purchased. In one embodiment, the electronic message may invite the recipient, to "sign-on" to network server 32 in order to select the color, style, or other optional characteristics associated with the purchased items.

In another embodiment, the purchaser may indicate very general criteria regarding the gift selected including, but not limited to, the price, style, color, manufacturer and/or any other general characteristic associated with an article(s). In response to such an order network server 32 may send an electronic message to the recipient inviting the recipient to communicate their preferences from the remaining criteria, not previously selected by the purchaser.

The operator of network server 32 may maintain a certain stock, or inventory level of the products offered for sale on web page 54. Accordingly, network server 32 may automatically alert the network operator to distribute products to the purchasers after purchase. In another embodiment, the operator of network server 32, may function as a broker, simply matching up buyers and sellers of products, without maintaining inventory.

In yet another embodiment, the operator of network server 32 may maintain very limited supplies and inventory of the products offered for sale. Since purchasers of undergarments typically buy in large quantities, a single purchaser may exhaust the supply or inventory of the operator of network server 32. Network server may be configured to recognize this "out of stock" or "insufficient stock" status associated with an order, and automatically notify another vendor of the product to ship sufficient quantities to fulfill the purchaser's order. The selected vendor may be an operator of client system 36, such that the vendor may communicate with network server 32 via communication link 38. This allows correspondence between the vendor using client system 36 and the operator of network server 32 to occur electronically. Billing, payments, and account summaries may be exchanged between the operator of network server 32 and client system 36 via communication link 38.

Virtual showroom 60 provides a user with the option of entering a specialized boutique. For example, selection of "Her Room Boutique" icon 150 (FIG. 2) may transfer the user into another virtual showroom, for example, web page 56. Web page 56 may be limited to generally higher priced and generally higher quality merchandise as compared to virtual showroom 60. In order to create a specialized atmosphere for the "on-line" shopper, web page 56 may include distinctive graphics to create a unique and elite shopping experience.

In one embodiment, web page 56 may be limited to products of certain "high-end" manufacturers. In fact, the operator of server 32 may require that each manufacturer elects to have its products displayed within virtual showroom 60, or the "Her Room Boutique" or web page 56. In this embodiment, manufacturers could not be listed within virtual showroom 60 and "Her Room Boutique" 56. In a particular embodiment, "Her Room Boutique" may include higher quality and more intensive graphics as compared to virtual showroom 60.

In accordance with another embodiment of the present invention, virtual showroom 60 includes an icon 151 entitled "gifts for her" (FIG. 2). By selecting (e.g. clicking) icon 151, a user is directed to web page 200, illustrated in FIG. 10. Web page 200 includes a plurality of thumbnail images 202–205. Each thumbnail image 202–205 corresponds to a gift set of garments and/or articles available to a purchaser. In a particular embodiment, the gift sets illustrated within thumbnail images 202–205 are made available to a purchaser who intends to purchase the gift set(s) for a third party, for example as a gift. The price for each gift set 202–205 is illustrated in a text field 196–199, respectively.

In the illustrated embodiment, gift set 202 includes an embroidered bra 206, embroidered thong 208, and a garter belt 210. Bra 206, thong 208 and/or garter belt 210 are presented as a gift set by an operator of web page 200 due to corresponding and/or similar characteristics which make each suitable for purchase and/or use by the third party, together as a unit. For example, each of bra 206, thong 208 and/or garter belt 210 may be fabricated from identical or matching fabric. Accordingly, a purchase or the third party gift recipient who receives one article may be likely to purchase the corresponding articles within the gift set.

Gift set 203 includes a matching two-piece matching ensemble including full busted bra 212 and lace front bikini 214. Gift set 204 includes a hidden wire bustier 216 and a lace front bikini 218. Similarly, gift set 205 includes a garter belt 220, embroidered thong 222 and demi-bra 224. Like gift set 202, each gift set 203–205 includes similar, corresponding, and/or matching components, suitable for purchase and/or use as a unit.

A description of each gift set 202–205 is provided within text fields 226–229, respectively. Text fields 226–229 may include information regarding manufacturer(s), fit, size and/or recommended use. Text fields 226–229 may also include information on various sizes, colors and/or other characteristics available for each garment included with each gift set. The purchaser may select a particular gift set by clicking-on an icon 195 alongside the selection.

Each garment included with each gift set 205–209 are made available to a purchaser in a variety of specific criteria associated with such garments. Such specific criteria may include, without limitation, shape, size, style, color, configuration and/or one or more measurements associated with said article(s). In a particular embodiment of the present invention, the purchaser may select one from each specific criteria available for each garment included with a particular gift set selected by the purchaser. Alternatively, the purchaser may select a particular gift set and specify some, but not all of the available specific criteria, and allow the recipient to select the others, as will be described later in more detail. Finally, the purchaser may select a particular gift set and allow the recipient to select from all of the available specific criteria regarding each garment or article included in the gift set. When the purchaser selects a particular gift set, the purchaser is provided the opportunity to conduct a transaction incorporating teachings of the present invention.

After the purchaser makes a selection, the purchaser may be charged for the price of the gift set. The purchaser may be prompted to enter valid credit card information. Alternatively, the purchaser may be billed, or a line of credit is established on the purchaser's behalf. In accordance with another embodiment, the purchaser may be billed after acceptance of the selection by the recipient. Accordingly, credit card information may be collected and stored for future billing.

FIG. 11 illustrates a method for conducting a transaction in accordance with a particular embodiment of the present invention. The method begins at step 250, where a purchaser is presented with a plurality of articles available for purchase. For the purposes of this FIGURE, it is assumed that the purchaser is selecting or purchasing the articles for, or on behalf of a third party recipient. In accordance with a particular embodiment, each article presented to the purchaser is associated with one or more gift sets. For example, the purchaser may be presented with gift sets 202–205 of FIG. 10.

At step 252, the purchaser makes a selection including one or more gift sets. Assume, for example, that the purchaser selects gift set 202 including embroidered bra 206, embroidered thong 208 and garter belt 210. In making the selection, the purchaser may specify one or more of the specific criteria available for articles 206–210. Alternatively, the user may select the gift set only, and leave the selection of any available specific criteria to the recipient.

Next, at step 254, the purchaser selects a recipient. The purchaser identifies the recipient to the operator of web page 200 with enough specificity for the operator to contact the recipient. For example, the purchaser may provide a name, address, telephone number and/or electronic mail address.

Upon selecting the gift set and identifying the recipient, the purchaser may pay for the gift set, for example by providing credit card information. Alternatively, the purchaser may opt to be billed later (e.g. after the recipient confirms the selection), particularly if one or more of the specific criteria may have an impact on the total price.

The operator generates an electronic mail message to the recipient at step 256. Other methods for contacting the recipient are available for use within the teachings of the present invention. In a particular embodiment, the electronic mail message includes information regarding the gift set and may include an image of the gift set similar to thumbnail image 202 of FIG. 10. The electronic mail also includes a unique identifier, for example, an alphanumeric identifier. The unique identifier allows the recipient to confirm their identity upon checkout. In a particular embodiment, the unique identifier may be required for the recipient to access particular web pages associated with virtual showroom 60 where the recipient may accept or reject the gift set and/or specify specific criteria regarding the gift set. The purchaser may also include a greeting or message to the recipient which will be included with the notification.

At step 258, the recipient views the articles associated with the selected gift set and is given the opportunity to accept or reject the selection(s) made by the purchaser. The recipient may view the thumbnail image included with the electronic mail. Alternatively, the user may log-on to web page 200 in order to view the gift set and/or articles. In accordance with a particular embodiment, a hyperlink may be included with the electronic mail which allows the user's web browser to locate web page 200. In another embodiment, the electronic mail may include a unique identifier and/or a brief description of the gift set, only. In this embodiment, the recipient must log on to web page 200 in order to view the gift set and/or articles. The purchaser may accept or reject the gift set at step 260, and also may accept or reject any specific criteria associated with the gift set, which were selected by the purchaser.

If the recipient accepts the gift set selected by the purchaser, the recipient enters personal information and/or preferences at step 262. Personal information entered by the recipient may include shipping information (e.g. name, address, delivery method). Preferences specified by the recipient may include one or more specific criteria regarding articles included with the gift set.

If the recipient rejects the gift set and/or any of the specific criteria selected by the purchaser, the recipient makes another selection at step 264. The selection(s) made by the recipient at this step may include another gift set altogether, and/or selecting particular criteria regarding the gift set. If the recipient rejects the selection made by the purchaser, and indicates an alternative selection, the recipient may be charged for the price difference between the original selection and the alternative selection. If the alternative selection is less expensive, the recipient may be credited for the price difference. Alternatively, the purchaser may be charged for the additional cost of the alternative selection or credited for any overpayment. Furthermore, the purchaser may specify a maximum overrun available to the recipient, and the recipient may be charged for any cost over this maximum price. Accordingly, the purchaser and the recipient may share the cost overrun.

Next, at step 266, the recipient checks out using the unique identifier. At this point, if the purchaser was not charged previously, the purchaser is charged (e.g. by credit card number provided when the selection was made) or billed for the purchase.

Finally, at step 268, the recipient receives confirmation of the selection and status. Confirmation includes a description of the articles included with the gift set and/or any specific criteria associated with the articles.

The teachings of the present invention may include hardware, software, and/or logic encoded in media, operable to display virtual showroom 60, perform transactions, communicate between the purchaser, recipient and/or operator of virtual showroom 60, and perform any of the functionality, steps, and/or methods disclosed within this specification and claims.

The articles and products described within this specification have been primarily limited to undergarments and complementary articles, such as outer garments. It will be recognized by those of ordinary skill in the art that any product or article may be displayed within master display field 62, within the teachings of the present invention. For example, a featured article may include a shoe or boot. In one embodiment, the shoe or boot may be displayed upon a second article, for example, the form of a human foot. In another embodiment, the electronic image displayed within field 62 may include a photograph or other suitable depiction of an article being worn by a human.

Accordingly, overlay images available for display within field 62 include, but are not limited to, hats over heads, shoes over feet, gloves over hands, pants over legs, glasses over faces, etc.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for conducting a transaction, comprising:
   presenting a plurality of gift sets to a purchaser, each gift set comprising a plurality of articles that are complementary to each other;
   wherein each of the plurality of articles in the gift set may be customized according to a plurality of specific criteria;
   receiving a selection from the purchaser, the selection comprising at least one of the plurality of gift sets;
   receiving identification information regarding a recipient of the gift set;
   electronically communicating a notification to the recipient, the notification including a unique identifier; and
   scheduling delivery of the selection to the recipient, if the recipient accepts the gift set.

2. The method of claim 1, further comprising allowing the recipient to select an alternative item if the recipient rejects the selection.

3. The method of claim 2, further comprising charging the recipient for at least a portion of a price difference between the alternative item and the selection.

4. The method of claim 2, further comprising charging the purchaser for at least a portion of a price difference between the alternative item and the selection.

5. The method of claim 1, wherein each gift set may be customized according to a plurality of specific criteria, and further comprising receiving at least one of the specific criteria regarding the selection, from the purchaser.

6. The method of claim 1, further comprising receiving at least one of the specific criteria regarding the selection, from the recipient.

7. The method of claim 6, wherein the articles comprise articles of clothing.

8. The method of claim 6, further comprising receiving at least a second specific criteria regarding the selection, from the purchaser.

9. The method of claim 6, wherein the at least one specific criteria is selected from the group consisting of price, style, color and manufacturer.

10. The method of claim 6, wherein the unique identifier comprises an alphanumeric identifier sufficient to confirm the identity of the recipient.

11. The method of claim 6, further comprising receiving personal information from the recipient.

12. The method of claim 11, wherein the personal information includes shipping information.

13. The method of claim 12, wherein the shipping information is selected from the group consisting of name, address and delivery method.

14. The method of claim 6, wherein the plurality of articles of each particular gift set comprise articles that are complementary to each other.

15. The method of claim 1, further comprising issuing the notification to the recipient via electronic mail.

16. The method of claim 15, wherein the notification includes a hyperlink to a virtual showroom and wherein the recipient may accept or reject the gift set by communicating with the virtual showroom.

17. The method of claim 1, further comprising issuing a confirmation message to the recipient confirming the selection and specific criteria regarding the selection.

18. The method of claim 1, further comprising issuing a confirmation message to the purchaser confirming the selection and specific criteria regarding the selection.

19. The method of claim 1, wherein the articles comprise articles of clothing.

20. The method of claim 19, wherein the articles of clothing are selected from the group consisting of bras, pantywear, slips, shapewear and maternity clothing.

21. The method of claim 20, wherein the specific criteria are selected from the group consistiong of size, shape, color and style.

22. The method of claim 1, wherein the identification information is selected from the group consisting of account number, telephone number, electronic mail address and physical address.

23. The method of claim 1, wherein the purchaser specifies a plurality of the specific criteria and the recipient specifies at least one specific criteria not previously specified by the purchaser.

24. The method of claim 1, wherein the plurality of articles of each particular gift set comprise articles that are complementary to each other.

25. A computer readable medium encoded with logic operable to:
  present a plurality of gift sets to a purchaser, each gift set comprising a plurality of articles that are complementary to each other;
  wherein each of the plurality of articles in the gift set may be customized according to a plurality of specific criteria;
  wherein each of the plurality of articles in the gift set may be customized according to a plurality of specific criteria; receive a selection from the purchaser, the selection comprising at least one of the plurality of gift sets;
  receive identification information regarding a recipient of the gift set;
  issue a notification to the recipient, the notification including a unique identifier; and
  schedule delivery of the selection to the recipient, if the recipient accepts the gift set.

26. The computer readable medium of claim 25, wherein the logic is further operable to allow the recipient to select an alternative item if the recipient rejects the selection.

27. The computer readable medium of claim 25, wherein the logic is further operable to issue the notification to the recipient via electronic mail.

28. The computer readable medium of claim 25, wherein the logic is further operable to issue a confirmation message to the purchaser confirming the selection and specific criteria regarding the selection.

29. The computer readable medium of claim 25, wherein the logic is further operable to issue a confirmation message to the recipient confirming the selection and specific criteria regarding the selection.

30. A system, comprising:
  means for presenting a plurality of gift sets to a purchaser, each gift set comprising a plurality of articles that are complementary to each other;
  wherein each of the plurality of articles in the gift set may be customized according to a plurality of specific criteria;
  means for receiving a selection from the purchaser, the selection comprising at least one of the plurality of gift sets;
  means for receiving identification information regarding a recipient of the gift set;
  means for issuing a notification to the recipient, the notification including a unique identifier; and
  means for scheduling delivery of the selection to the recipient, if the recipient accepts the gift set.

31. The system of claim 30, further comprising means for allowing the recipient to select an alternative item if the recipient rejects the selection.

32. The system of claim 30, further comprising means for issuing the notification to the recipient via electronic mail.

33. The system of claim 30, further comprising means for issuing a confirmation message to the recipient confirming the selection and specific criteria regarding the selection.

34. The system of claim 30, further comprising means for issuing a confirmation message to the purchaser confirming the selection and specific criteria regarding the selection.

* * * * *